March 2, 1948.  A. R. ROSS  2,436,975

KNURLING TOOL

Filed Jan. 24, 1945

INVENTOR
Albert R. Ross
By Carlsen, Pitzner, Hubbard & Wolfe
ATTORNEYS

Patented Mar. 2, 1948

2,436,975

UNITED STATES PATENT OFFICE 2,436,975

KNURLING TOOL

Albert R. Ross, Western Springs, Ill., assignor to Boyar-Schultz Corporation, Chicago, Ill., a corporation of Illinois Application January 24, 1945, Serial No. 574,393

6 Claims. (Cl. 80—5.1)

The invention relates to knurling tools generally and more particularly to an improved knurling tool of the swing type.

In swing type knurling tools heretofore available difficulty has been experienced as a result of work flexure in a direction normal to the direction of swing for the knurl and occasioned by the fact that the knurl contacts the work at a point displaced from a plane passing through the work center. Such difficulty is particularly acute in dealing with workpieces of small diameter and has resulted in distortion, breakage and inaccurate work. More particularly, if a pair of knurls are arranged to swing into contact with opposite sides of a workpiece about fixed centers of swing they will contact the work at precisely diametrically opposite points with only one diameter of workpiece. For any other diameter such points lie in a plane displaced from the center of the work so that the knurls apply a component of force to the work tending to flex it. With the above in view, one object of the invention is to overcome the above objections by providing an improved knurling tool embodying novel self-adjusting or self-alining features which automatically adapt the tool for operating on workpieces of any one of a large variety of diameters.

Another object is to provide an improved knurling tool adapted to carry a pair of revoluble knurls positioned on opposite sides of the workpiece and fed simultaneously thereto and characterized by the provision of means for automatically centering the knurls with respect to the work regardless of the diameter of the latter.

Other objects and advantages of the invention will become apparent from the following detailed description of the preferred embodiment illustrated in the accompanying drawing in which.

Figure 1:
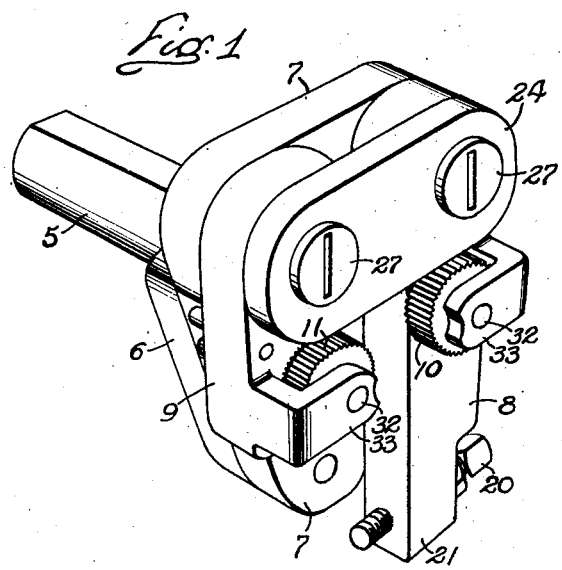
Figure 1 is a perspective view of a knurling tool embodying the features of the invention.

While the invention is susceptible of various modifications and alternative constructions, I have shown in the drawings and will herein describe in detail, the preferred embodiment, but it is to be understood that I do not thereby intend to limit the invention to the specific form disclosed, but intend to cover all modifications and alternative constructions falling within the spirit and scope of the invention as expressed in the appended claims.

Figure 2:
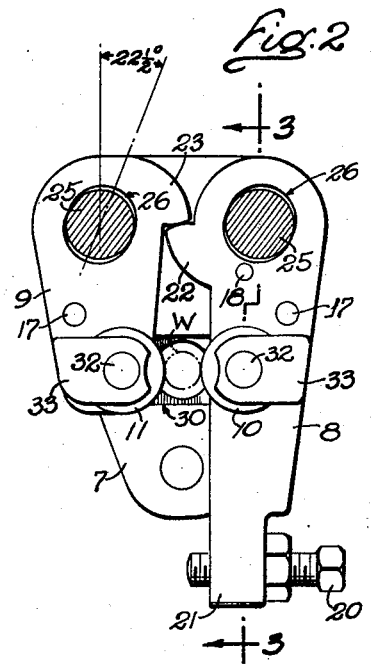
Fig. 2 is an end view of the tool with the front cover plate removed.

For purposes of illustration, the invention has been shown as applied to a double knurling tool of the type disclosed and claimed in the copending application of Harry Boyar, Serial No. 574,394, filed January 24, 1945. The exemplary tool comprises generally a rigid body including an elongated shank 5 having a rigid face plate 6 at one end to which is secured a generally triangular mounting plate 7. The shank 5, as herein shown, is of hollow construction and is adapted to be secured in the tool socket of an automatic screw machine or similar machine tool for movement axially of a rotatably supported workpiece W (Fig. 2).

Pivotally mounted on the front face of the plate 7 are a pair of elongated knurl supporting elements or levers 8 and 9. The levers are arranged in side-by-side relation and spaced apart to straddle the workpiece. Means is provided on the levers for supporting revoluble knurls 10 and 11 with their axes generally parallel to the axis of the workpiece and disposed for engagement with opposite sides of the workpiece as the levers are swung together.

Figure 3:
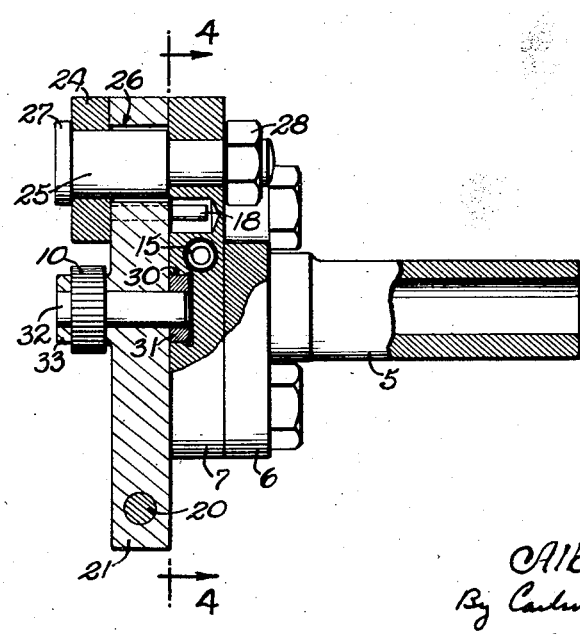
Fig. 3 is a side view of the tool partly in elevation and partly sectioned along the line 3—3 of Fig. 2.
Figure 4:
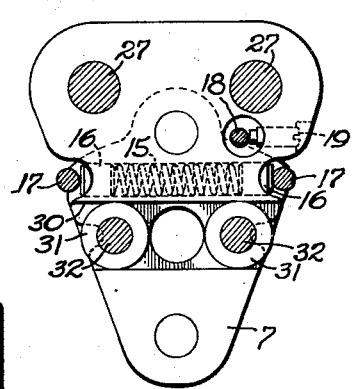
Fig. 4 is a sectional view taken in a vertical plane substantially on the line 4—4 of Fig. 3.

The levers 8 and 9 are normally held in a retracted position by a spring 15 (Fig. 4) confined between a pair of plungers 16 slidable in a transverse bore in the plate 7 and bearing against pins 17 (see also Fig. 2) rigid with and projecting rearwardly from the respective levers. A pin 18 (Figs. 3 and 4) projecting rearwardly from the lever 8 for engagement with an adjustable stop screw 19 threaded into the plate 7 suitably determines the limit or full retracted position of the levers.

For swinging the levers 8 and 9 together to feed the knurls 10 and 11 to the workpiece, an adjusting screw 20 is threaded into an extension 21 of the lever 8 and positioned for engagement with a stationary member such as a fixed or adjustable guide in the forward movement of the tool support to associate the tools with the work. The knurl supporting levers are interconnected for conjoint swinging movement toward or from the work by interengaging shouldered extensions 22 and 23 on the respective levers. The extensions are formed and arranged so that the feed movements of the knurls and the pressures with which they are applied to the work are equalized.

In the double knurling tool, as described in the copending application above referred to, the knurls are rocked through an arc about fixed centers, which means that for only one diameter of all the diameters within the capacity of the tool do the knurls engage the workpiece at diametrically opposite points. Since the knurls are therefore, in most instances, not in line with the work, it becomes necessary to provide support for the work, particularly in the smaller diameters, to prevent bending up or down depending upon the vertical position of the knurls. Such provisions for support are by nature makeshift and unsatisfactory and as a general rule should be avoided.

In carrying out the present invention, provision is made for supporting and guiding the levers 8 and 9 in a novel and advantageous manner which automatically centers the knurls 10 and 11 with reference to the workpiece to insure their engagement therewith at diametrically opposite points regardless of the diameter of the piece. In the preferred form of the tool illustrated, the levers are mounted to turn on pivotal axes arranged substantially parallel to the rotational axis of the workpiece and for limited movement transversely of such pivotal axis generally lengthwise of the levers. Guide means coacting with the levers effects the lateral shifting thereof in response to the rocking movement of the levers, so as to guide the knurls in a straight line intersecting the axis of the workpiece. Thus, irrespective of the diameter of the workpiece, the knurls automatically engage therewith at diametrically opposite points. As a result, transverse strains imposed on the workpiece are minimized and springing of the same is effectually eliminated.

Referring to the drawings, the levers 8 and 9 are confined between the mounting plate 7 and a cover plate 24 which serve to anchor a pair of rigid studs 25 in spaced parallel relation. Each of the levers is provided at its upper end with a hole 26 dimensioned to receive one of the studs 25. As herein shown, the studs 25 are formed with heads 27 engageable with the cover plate 24 and nuts 28 threaded on the inner ends of the studs coact with the mounting plate 7 to hold the parts in assembled relation.

To permit limited shifting of the levers 8 and 9 relative to their pivotal axes as defined by the studs 25, the holes 26 in the levers are elongated or oval in form. Preferably each hole is formed with its minor axis dimensioned to receive the stud 25 with a sliding fit so that the movements of the lever relative to the stud are confined to the major axis of the hole. The latter is conveniently disposed at an angle to the longitudinal axis of the lever to reduce the strain on the parts and otherwise improve the operating characteristics of the tool. In practice, it has been found that an angle of 22½ degrees is quite satisfactory.

Simple, yet effective, means is provided for shifting the levers 8 and 9 relative to the studs 25 so as to maintain the knurls 10 and 11 centered with respect to the workpiece W in all positions of the lever. For this purpose, the mounting plate 7 has formed in its front face a transverse guide slot 30 adapted to receive guide rollers 31 carried by the respective knurl supporting levers.

In the preferred form of the tool, the guide slot 30 is centered with respect to the rotational axis of the workpiece W and the guide rollers 31 are journaled on bearing pins 32 which also rotatably support the knurls 10 and 11. Brackets 33 rigid with the respective levers, support the outer ends of the pins 32 thereby assisting in maintaining the pins rigid. By thus mounting the guide rollers 31 on the same axes as the knurls 10 and 11 and centering the guide slot 30 with respect to the work, a high degree of accuracy in the presentation of the knurls to the work is insured.

In operation, the tool is moved into operative relation to the workpiece with the levers 8 and 9 swung out to their retracted positions by the spring 15 and plungers 16. With the levers so positioned, the guide rollers 31 in coaction with the walls of the guide slot 30 draw the levers downwardly with reference to the studs 25 so as to maintain the knurls 10 and 11 alined with the axis of the workpiece W. The levers are actuated in the usual manner by engagement of the adjusting screw 20 with a cam or the like which serves to rock the lever 8 in a clockwise direction as viewed in Fig. 2, thus feeding the knurl 10 into the workpiece. A similar but oppositely directed movement is imparted through the shouldered extensions 22 and 23 to the lever 9 to feed the knurl 11 into the work to an equal depth.

As the levers are swung inwardly to feed the knurls to the work, the guide rollers 31 traverse the guide slot 30 and continuously adjust the positions of the levers with respect to their pivotal axes, thereby confining the feeding movements of the knurls to a straight line intersecting the axis of the workpiece W. Since the knurls are alined or centered with respect to the work in all positions of the levers, it necessarily follows that they invariably engage a workpiece at diametrically opposite points irrespective of the diameter of the same.

It will be apparent from the foregoing that the invention provides an improved double knurling tool of novel and advantageous construction. By supporting knurls on levers capable of being shifted relative to their respective pivotal axes and by providing guide means for effecting such adjustment of the levers, the movements of the knurls are confined to a straight line, thereby automatically insuring proper engagement with different workpieces regardless of their diameter. Frequent manual adjustment of the tool is therefore unnecessary and a substantial amount of time is saved in the knurling of workpieces of different sizes.

I claim as my invention:

1. In a knurling tool, in combination, a rigid body, a pair of elongated levers pivotally mounted on said body at one end and spaced apart at their other or free ends to straddle a cylindrical workpiece, means adjacent the free end of each lever for supporting a revoluble knurl, means interconnecting said levers for conjoint swinging movement about their respective pivots to move the free ends of the levers toward or from the workpiece, and means on said body coacting with means on said levers for bodily adjusting said levers along their length and transversely relative to their pivotal axes during the swinging movement of the levers so as to maintain the knurl supporting means of both levers centered on a straight line intersecting the axis of the workpiece.

2. In a knurling tool, the combination with a mounting plate, of a pair of studs rigidly secured to said plate in spaced parallel relation, a pair of levers each having a hole at one end adapted to receive one of said studs, said holes being generally oval and disposed to permit pivotal movement of the levers thereabout and limited endwise movement of the levers relative thereto, knurl holding means on each lever, a straight guide slot in the face of said plate, and a guide roller on each lever engageable in said slot, said guide rollers acting to shift the levers endwise relative to the respective studs and thereby guide said knurl holding means in a straight line when the levers are rocked about the studs.

3. In a knurling tool, the combination with a rigid mounting plate, of a pair of studs anchored to said plate in spaced parallel relation, a pair of levers pivotally mounted in said studs, each of said levers having a stud receiving hole dimensioned to permit movement of the lever relative to the stud along a line disposed at an angle to the longitudinal axis of the lever, knurl supporting means for each lever, a straight guide slot extending transversely across said mounting plate and equally spaced from said studs, and guide rollers carried by said levers engageable in said slot operative in the pivotal movement of said levers to shift the levers relative to said studs and thereby confine the movements of the knurl supporting means to a straight line.

4. In a knurling tool, the combination with a rigid mounting plate, of a pair of studs anchored to said plate in spaced parallel relation, a pair of levers pivotally mounted on said studs, each of said levers having a stud receiving hole dimensioned to permit movement of the lever relative to the stud along a line disposed at an angle to the longitudinal axis of the lever, knurl supporting means including a pair of cylindrical pins mounted on said levers with their axis parallel to the axes of said studs, a straight guide slot extending transversely across the face of said mounting plate, and guide rollers journaled on said pins and engageable in said slot, said guide rollers cooperating with said slot in the pivotal movement of said levers to guide said knurl supporting means in a straight line.

5. A knurling tool for operating on workpieces of different diameters comprising, in combination, a supporting member, a pair of elongated elements each pivoted adjacent one end on said supporting member and having their free ends spaced apart to receive a rotatably driven workpiece therebetween, each of said elements having means located adjacent its free end for supporting a revoluble knurl with its axis substantially parallel to the axis of the workpiece, means for swinging said elements about their pivots to carry their free ends inwardly and thereby feed the knurls simultaneously to opposite sides of the workpiece, and means on said supporting member coacting with means on said elements for bodily adjusting said elements along their length and transversely relative to their pivotal axes so as to maintain the knurls centered on a straight line through the center of the workpiece.

6. A knurling tool for operating on workpieces of different diameters comprising, in combination, a supporting member, a pair of elongated elements each pivoted adjacent one end on said supporting member and having their free ends spaced apart to receive a rotatably driven workpiece therebetween, each of said elements having means adjacent its free end for supporting a revoluble knurl with its axis substantially parallel to the axis of the workpiece, means for swinging said elements about their pivots to carry their free ends inwardly and thereby feed the knurls simultaneously to opposite sides of the workpiece, and coacting guide means on said elements and said member operative for bodily adjusting said elements along their length and transversely relative to their pivotal axes during the swinging movement of said elements so as to maintain the knurls centered on a straight line perpendicular to the axis of a workpiece.

ALBERT R. ROSS.

REFERENCES CITED

The following references are of record in the file of this patent:

UNITED STATES PATENTS

| Number | Name | Date |
|---|---|---|
| 656,952 | Dornheim | Aug. 28, 1900 |
| 855,658 | O'Brien | June 4, 1907 |
| 2,294,685 | Nelson | Sept. 1, 1942 |